United States Patent
Slamani et al.

(10) Patent No.: US 10,432,325 B1
(45) Date of Patent: Oct. 1, 2019

(54) TESTING PHASE NOISE IN OUTPUT SIGNAL OF DEVICE UNDER TEST USING TRANSFORMABLE FREQUENCY SIGNALS

(71) Applicant: GLOBALFOUNDRIES INC., Grand Cayman (KY)

(72) Inventors: Mustapha Slamani, South Burlington, VT (US); Rebecca R. Percy, Essex Junction, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/002,837

(22) Filed: Jun. 7, 2018

(51) Int. Cl.
*H04B 17/10* (2015.01)
*H04B 17/345* (2015.01)
*H04L 29/08* (2006.01)

(52) U.S. Cl.
CPC ......... *H04B 17/104* (2015.01); *H04B 17/345* (2015.01); *H04L 67/12* (2013.01)

(58) Field of Classification Search
CPC ........................... H04B 14/104; H04B 14/345
See application file for complete search history.

(56) References Cited

U.S. PATENT DOCUMENTS

| 10,181,915 | B1 * | 1/2019 | Slannani | H04B 17/29 |
| 2013/0197848 | A1 * | 8/2013 | Sariaslani | G01R 29/26 702/111 |
| 2016/0146881 | A1 * | 5/2016 | Horng | G01R 31/2646 324/613 |
| 2017/0264469 | A1 * | 9/2017 | Otani | H04L 25/03993 |

FOREIGN PATENT DOCUMENTS

EP 0660124 A2 6/1995

OTHER PUBLICATIONS

Gheidi et al., "Phase-Noise Measurement of Microwave Oscillators Using Phase-Shifterless Delay-Line Discriminator," IEEE Transactions on Microwave Theory and Techniques, vol. 58, No. 2, Feb. 2010, pp. 468-477.
Unknown, "Techniques for Measuring Ultra-Low Phase Noise in Microwave Amplifiers," Phase Noise Application Notes, AML Communications Inc., pp. 65-69.
Khalil et al., "Self-Calibrated On-Chip Phase-Noise Measurement Circuit With—75 dBc Single-Tone Sensitivity at 100 kHz Offset," IEEE Journal of Solid-State Circuits, vol. 42, No. 12, Dec. 2017, 8 pages.
Walls, "Cross-Correlation Phase Noise Measurements," Frequency Control Symposium 46ths, Proceedings of the 1992 IEEE.

* cited by examiner

*Primary Examiner* — Gary Mui
(74) *Attorney, Agent, or Firm* — Anthony Canale; Hoffman Warnick LLC (57) ABSTRACT

Embodiments of the present disclosure provide a system, method, and program product to test phase noise. The system may include a frequency converter for reducing a frequency of a portion of the output signal to a transformable frequency, a bandpass filter electrically coupled to the frequency converter for filtering the portion of the output signal the transformable frequency using a predetermined bandwidth, and waveform analysis module for receiving the filtered signal. The frequency converter may include a variable electronic oscillator (EO) configured to select one portion of the output signal. The waveform analysis module applies a Fast Fourier Transform (FFT) to each filtered portion of the output signal, and combines them to yield a total FFT for the output signal.

20 Claims, 6 Drawing Sheets

TESTING PHASE NOISE IN OUTPUT SIGNAL OF DEVICE UNDER TEST USING TRANSFORMABLE FREQUENCY SIGNALS

TECHNICAL FIELD

Embodiments of the disclosure relate generally to devices and methods for testing signal noise in a device under test (DUT). The various embodiments described herein may convert portions of an output signal from an initial frequency to a transformable frequency, and transform the signal at the transformable frequency before recombining them to calculate phase noise.

BACKGROUND

The use of multiple interconnected devices over a wide area, colloquially known as "internet of things" or "IOT," is a rapidly growing area of electronics engineering. Each interconnected device in an IOT arrangement can include one or more radio frequency (RF) components to provide signal transmission and reception with respect to other devices in the same network. The sheer number of interconnected devices in such arrangements has accompanied significant increases in the signal processing burden on electronic systems. One of the most important procedures for determining compliance with consumer and technical demands is "phase noise" testing of RF components. Phase noise generally refers to the short-term and random fluctuations in the phase of a waveform expressed in the frequency domain. Phase noise stems from time domain instabilities of a signal, also known as "jitter."

Testing the phase noise in an electronic system conventionally requires the assistance of a test house. The test house may provide a large number of testing devices for examining the amount of phase noise in the signal processing components of a device. The speed of testing depends heavily on the total number of test devices that are available in the test house at a given time. The ever-increasing manufacturing volume and consumer demand for devices with RF components has caused a strain on test houses, e.g., because testing speed may not be sufficient for a testing device to be available for all products at all times. Simply purchasing or building more testing equipment will not be enough to ease this burden because each test structure carries an immense manufacturing cost and will nonetheless continue to perform tests at too slow a rate by conventional test methods.

SUMMARY

A first aspect of the present disclosure provides a method for testing phase noise in an output signal of a device under test (DUT), the method including: performing a first process including: reducing one of a plurality of portions of the output signal of the DUT from an initial frequency to a transformable frequency, filtering the selected portion of the output signal at the transformable frequency outside a predetermined bandwidth to create a filtered portion of the output signal, applying a Fast Fourier Transform (FFT) to the filtered output signal for the selected portion of the output signal to create a transformed portion of the output signal, and repeating the reducing, the filtering, and the applying until a transformed portion of the output signal is created for each of the plurality of portions of the output signal; and upon completing the first process, perform a second process including: combining each transformed portion of the output signal to create a total FFT for the output signal of the DUT, and calculating a phase noise for the output signal of the DUT based on the total FFT for the output signal of the DUT.

A second aspect of the present disclosure provides a system for testing phase noise in an output signal of a device under test (DUT), the system including: a frequency converter configured to reduce a frequency of the output signal of the DUT from an initial frequency a transformable frequency, wherein a reference clock of the frequency converter is selectable between a plurality of frequencies to convert one of a plurality of portions of the output signal, and wherein each of the plurality of frequencies is configured to convert one of the plurality of portions of the output signal from the initial frequency to the transformable frequency; a bandpass filter electrically coupled to the frequency converter and configured to filter each of the plurality of portions of the output signal at the transformable frequency outside a predetermined bandwidth to create a filtered portion of the output signal; and a waveform analysis module communicatively coupled to the frequency converter, and configured to receive the filtered portion of the output signal from the bandpass filter, and further configured to: perform a first process including: selecting one of the plurality of portions of the output signal using the frequency converter; receiving the filtered portion output signal corresponding to the selected frequency of the reference clock of the frequency converter; applying a Fast Fourier Transform (FFT) to the filtered portion of the output signal to create a transformed portion of the output signal; and repeating the selecting, the receiving, and the applying until a transformed portion of the output signal is created for each of the plurality of portions of the output signal; upon completing the first process, perform a second process including: combining each transformed portion of the output signal to create a total FFT for the output signal of the DUT; calculating a phase noise for the output signal of the DUT based on the total FFT for the output signal of the DUT.

A third aspect of the present disclosure provides a computer program product stored on a computer readable storage medium, the computer program product comprising program code, which, when being executed by at least one computing device, causes the computing device to test phase noise in an output signal of a device under test (DUT) by performing actions including: performing a first process including: signaling a frequency converter to reduce a frequency of a portion of the output signal of the DUT from an initial frequency to a transformable frequency, wherein a bandpass filter electrically coupled to the frequency converter filters the portion of the output signal at the transformable frequency outside a predetermined bandwidth to create a filtered portion of the output signal, applying a Fast Fourier Transform (FFT) to the filtered output signal for the filtered portion of the output signal to create a transformed portion of the output signal, and repeating the reducing and the applying until a transformed portion of the output signal is created for each of the plurality of portions of the output signal; and upon completing the first process, perform a second process including: combining each transformed portion of the output signal to create a total FFT for the output signal of the DUT, and calculating a phase noise for the output signal of the DUT based on the total FFT for the output signal of the DUT.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

The disclosure provides a system, method, and program product for testing phase noise in an output signal of a device under test (DUT). In particular, the DUT may take the form of a radio frequency (RF) component, a device which generates an output signal using one or more RF components, and/or other electrical devices which generate outputs in the form of a waveform. Such waveforms may transmit data and/or other electrical information by having an amplitude which deviates from a base value by amounts indicative of information (e.g., ones and zeros) being carried via the signal. As noted previously, phase noise refers to random changes in the waveform which do not originate from information in the propagated signal and thus decrease the accuracy of a transmission. Devices in an IOT device must operate with a phase noise within predetermined limits to ensure that signals are interpreted correctly. Embodiments of the disclosure provide analytical techniques which may be implemented via systems, methods, program products, etc., for quickly and accurately measuring the phase noise of an output signal from a DUT.

Figure 1:
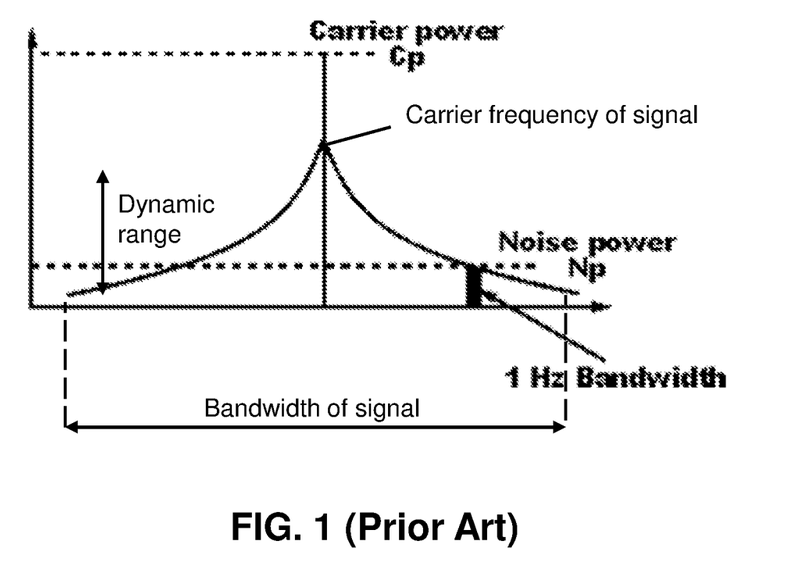
FIG. 1 shows a frequency domain plot of performing a Fast Fourier Transform (FFT) analysis on an output signal according to conventional methods.

Referring to FIG. 1, an amplitude-frequency (i.e., frequency domain) of a signal from a DUT is shown to illustrate conventional processes for testing the phase noise of a signal. In some cases, a test device may attempt to calculate the phase noise of a signal by applying a Fast Fourier Transform on the entire bandwidth of a signal. A "Fourier Transform" is a mathematical operation in which a signal is separated into a series of individual sine waves which may be added together to substantially approximate the original signal. A "Fast Fourier Transform," abbreviated as "FFT" herein, refers to a mathematical process for calculating the Fourier Transform of a signal by mathematically approximating and changing several portions of the conventional Fourier Transform analysis. In technical literature, the terms "Fourier Transform" or "FFT" may refer to both the operations for converting a signal into a sum of component sine waves, and the sum of component sine waves produced from these techniques. In the present disclosure, "applying" FFT refers to the mathematical process of converting a signal bandwidth into a sum of component sine waves, while a "transformed signal" refers to the resulting sum of component sine waves that may represent the signal bandwidth. In FIG. 1, the frequency bandwidth of a signal is shown over a range on the X-axis and the signal amplitude is shown on the Y-axis. The carrier power for the signal ($C_r$) is shown as the amplitude of the signal at the midpoint of the frequency domain. Phase noise may be calculated as deviations in frequency along the amplitude curve over the complete signal bandwidth. "Dynamic range" refers to the range in signal amplitude over the signal bandwidth in the frequency domain.

Technical intuition suggests that applying FFT on the entire signal bandwidth is the fastest and most complete way to analyze a signal. Unfortunately, applying FFT to the entire bandwidth carries inherent technical limitations. These limitations are known in the art as FFT leakage. The most significant source of FFT leakage is known as "incoherent sampling." Incoherent sampling refers to signal noise from the left (e.g., portions of the signal below the minimum bandwidth frequency) and right (e.g., portions of the signal above the maximum bandwidth frequency) contaminating the measurable noise within the frequency bandwidth. This reduces the accuracy of the measured phase noise, and may cause some DUTs to be incorrectly marked as compliant or non-compliant with a tolerance level for noise. In addition, applying FFT to an entire signal may be effective only on relatively high power signals. FFT analysis of a signal's entire frequency bandwidth may offer a limited dynamic range for amplitude measurement, thereby reducing the inaccuracy of measurement at several portions of the frequency bandwidth.

Figure 2:
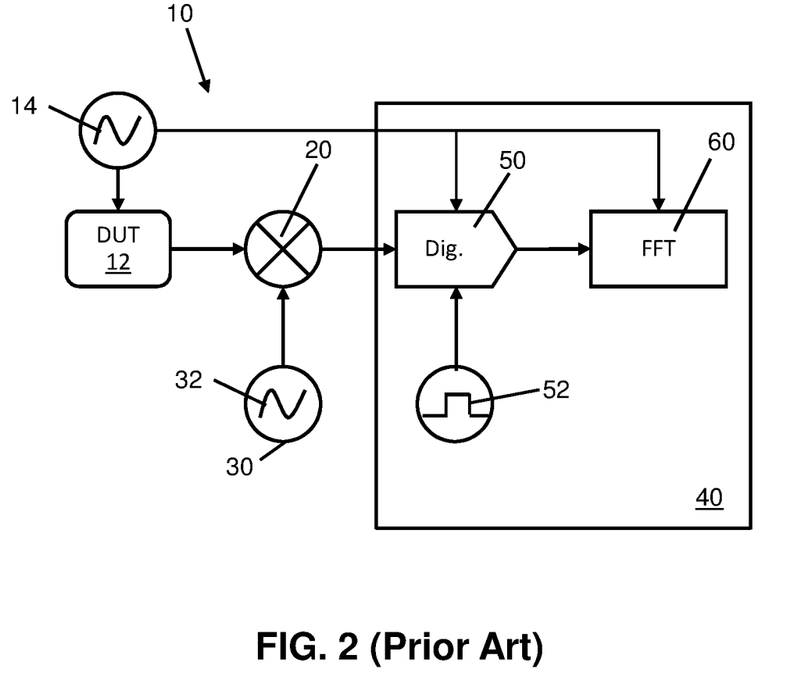
FIG. 2 shows a schematic view of a conventional system for testing phase noise of an output signal using a fixed electronic oscillator.

Turning now to FIG. 2, past approaches for applying FFT to the output signal from a DUT have introduced additional components for modifying the output signal before applying the FFT. These components have addressed some limitations of applying FFT to the entire signal bandwidth, yet have introduced further limitations in some cases. Embodiments of the disclosure eliminate these shortcomings of the procedure shown in FIG. 2, and thus this alternative technique is discussed to further contrast with the present disclosure. FIG. 2 illustrates a conventional test system 10 for testing phase noise in an output signal. System 10 may include a device under test (DUT) 12, which generates an electrical output signal using an internal reference clock 14. The frequency of internal reference clock 14 synchronizes all components in system 10.

To reduce the effect of incoherent sampling on the FFT for DUT 12, a frequency converter 20 may be coupled to the output of DUT 20. Frequency converter 20 typically takes the form of a signal mixer configured to change the frequency of output signals from DUT 12 from an initial frequency to another frequency. In an example, frequency converter 20 reduces the output signal from DUT 12 to a frequency that is lower than its original value. To provide this function, frequency converter 20 may electrically mix the output signal from DUT 12 using a fixed electronic oscillator (EO) 30, also known in the art as a local oscillator (LO) having a fixed reference clock 32. Fixed reference clock 32 is also transmitted to frequency converter 20 to provide a synchronized operation in system 10 as noted elsewhere herein. Filtering the output signal may reduce incoherent sampling from portions of the signal near the upper and lower frequency bandwidths, but will also reduce the dynamic range of the eventual FFT for the signal.

The reduced-frequency signal then travels to a waveform analysis module 40, where a digitizer ("Dig.") 50 converts the signal to a digital representation (e.g., a sequence of ones and zeros) using a fixed sampling clock 52. The digitized signal is then processed using an FFT module 60, to provide a transformed signal which may be tested for phase noise. Including frequency converter 20 with fixed EO 30 in system 10 will inherently reduce the frequency of the transformed output signal, while maintaining the same bandwidth. Adjusting the output signal's carrier frequency (also known as a "center frequency") with frequency converter 20 and fixed EO 30 is both advantageous and disadvantageous. Transformed output signals created with system 10 will reduce the signal frequency of the signal under test, but also reduce the dynamic range of testing and thereby limit testing accuracy. Alternative test structures and techniques may rely on, e.g., delay lines and phase shifters with other components to test phase noise. These alternatives are unsatisfactory because they require longer testing times as compared to FFT analysis, and may be effective only for limited ranges of frequency bandwidth and/or signal power.

Figure 3:
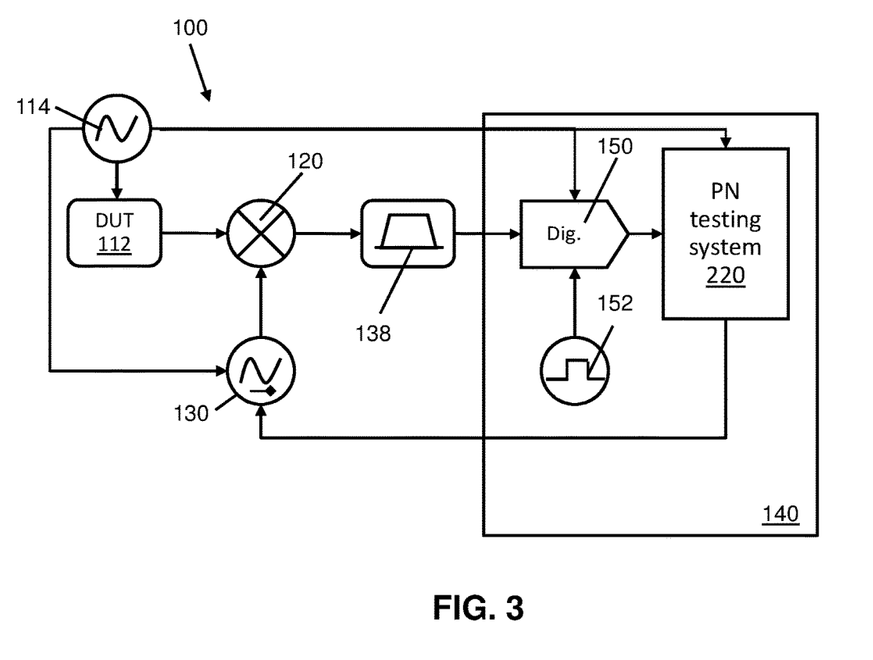
FIG. 3 shows a schematic view of a system for testing phase noise in an output signal of a device under test (DUT) according to embodiments of the disclosure.

Turning to FIG. 3, a system 100 according to embodiments of the disclosure is shown. System 100 overcomes the limitations of system 10 (FIG. 2), e.g., by structural changes in addition to changing the methodology for conducting FFT analysis of the signal bandwidth. In particular, system 100 may separate an output signal into smaller portions, transform each portion using FFT, and add the transformed signal portions together. System 100 for example may combine the transformed portions using "superposition," a technique for combining waveforms by addition, to create a transformed output signal over the entire frequency bandwidth.

System 100 may include, e.g., a DUT 112 which operates using a fixed reference clock 114 for synchronizing the output of DUT 112. DUT 112 may transmit output signals at an initial frequency that may be too high for phase noise testing using FFT analysis. According to an example, the initial frequency of output signals generated with DUT 112 may be, e.g., approximately 12.0 gigahertz (GHz). This initial frequency may be known in RF applications as a "high frequency" signal. Applying FFT to test the phase noise of a signal may be more effective at a "transformable frequency," also known in RF applications as an "intermediate frequency" range, e.g., approximately 10.7 GHz. Low frequency signals are also possible, but may not be applicable to embodiments of the disclosure. Simply converting the output signal of DUT 112 from its original frequency to a transformable frequency may carry limitations as noted with respect to system 10 (FIG. 2). System 100 includes structural features to reduce signal frequency while ensuring that a wider bandwidth of the output signal is captured. For example, system 100 may include a frequency converter 120. Frequency converter 120 may take the form of an RF mixer, e.g., a simple or differential mixer as may be known in the art, or a complex block (e.g., a field programmable gate array (FPGA) with other electrical elements such as filters, amplifiers, attenuators, etc.) for providing a similar or same electrical function as an RF mixer. Frequency converter 120 may reduce the output signal frequency from DUT 112 from an initial frequency (e.g., 12.0 GHz as noted above) to a transformable frequency (e.g., 10.7 GHz) as noted above. It is emphasized that the transformable signal frequency output from frequency converter 120 may be constant.

Embodiments of system 100 include additional features so that frequency converter 120 may be applied to different portions of an output signal from DUT 112. As shown in FIG. 3, frequency converter 120 may be driven by an adjustable electronic oscillator (EO) 130 coupled to reference clock 114. Reference clock 114 may be set to a predetermined frequency, e.g., approximately 10 MHz. Reference clock 114 may be coupled to other components of system 100 (e.g., bandpass filter 138, digitizer 150, PN testing system 220 discussed herein) to provide synchronized operation. Unlike oscillator 30 (FIG. 2) of system 10, adjustable EO 130 may be selectable between a plurality of frequencies, as suggested by the slider on adjustable EO 130 in FIG. 3. Adjustable EO 130 may be embodied, e.g., as a phase locked loop (PLL). A PLL refers to an electrical control signal for with an output phase is mathematically dependent on the phase of an input signal, e.g., by a predetermined mathematical relationship. In this case, the phase of reference clock 114 determines the phase of signals output from adjustable EO 130. Adjusting the frequency of adjustable EO 130 may cause frequency converter 120 to target the frequency bandwidth of output signal from DUT 112 to be converted. Adjustable EO 130 may be selectable between a range of frequencies, each of which may be separated from each other by a predetermined amount (e.g., a step change in MHz). Thus, setting adjustable EO 130 to a particular frequency may cause frequency converter 120 to convert only a portion of the output signal from DUT 112 from its initial frequency to the transformable frequency.

Frequency converter 120 and adjustable electronic oscillator 130 may allow system 100 to adjust the bandwidth range of an output signal from DUT 112 in an active manner. This change would be of little value in isolation, due to the previously-noted effects of incoherent sampling when the bandwidth range is changed. System 100 features a bandpass filter 138 with a fixed filtering bandwidth to prevent incoherent sampling. A bandpass filter refers to a type of electrical circuit which processes an incoming signal to remove all portions of the signal that are less than a minimum frequency and greater than a maximum frequency, i.e., a "bandwidth." It is noted that the bandwidth of bandpass filter 138 may be held constant, regardless of which portion of the output signal is selected via adjustable EO 130. In an example embodiment, bandpass filter 138 may feature a bandwidth of approximately thirty kilohertz (KHz). Bandpass filter 138 may be electrically coupled to frequency converter 120, such that bandpass filter 138 filters each portion of the signal at the transformable frequency, corresponding to the output signal from DUT 112, outside a predetermined bandwidth. Bandpass filter 138 thus may generate a filtered portion of the output signal to be analyzed using a waveform analysis module 140.

Waveform analysis module 140 may be communicatively coupled to frequency converter 120, and may receive filtered portions of the output signal from bandpass filter 138. Waveform analysis module may take a variety of forms, and as non-limiting examples may include software components, hardware components, combinations of hardware and software, etc., for implementing phase noise analysis techniques as discussed herein. According to an example embodiment, waveform analysis module 140 may include an FPGA with electrical hardware encoded to receive, interpret, and analyze filtered output signals carried from bandpass filter 138. Various subcomponents of waveform analysis module 140 are discussed by example herein, but it is understood that such components may be provided as independent components electrically coupled to waveform analysis module 140.

Waveform analysis module 140 may include or be electrically coupled to a digitizer ("Dig.") 150 configured to receive filtered portions of the output signal from bandpass filter 138. Digitizer 150 may receive filtered portions of the output signal in an analog form, and convert them into a representation of the same signal expressed through binary digits (i.e., ones and zeros). A fixed reference clock 152 may drive digitizer 150 according to a particular frequency, e.g., 10 MHz. It is understood that digitizer 150 may be provided separately from waveform analysis module 140, or that in alternative embodiments it may be possible to analyze non-digitized signals. Waveform analysis module 140 may include a phase noise testing system ("PN testing system 220") which accepts the digitized and filtered portions of the output signal, and may use a calculator to apply an FFT to the filtered portion of the output signal to create a transformed portion of the output signal. Phase noise system 220 of waveform analysis module 140 may also be communicatively coupled to adjustable EO 130. During operation, phase noise system 220 may cause adjustable EO 130 to select different portions of the output signal from DUT 112 for testing with waveform analysis module 140. The operational steps for providing this function are discussed in further detail herein with respect to the process flow of FIG. 6.

Figure 4:
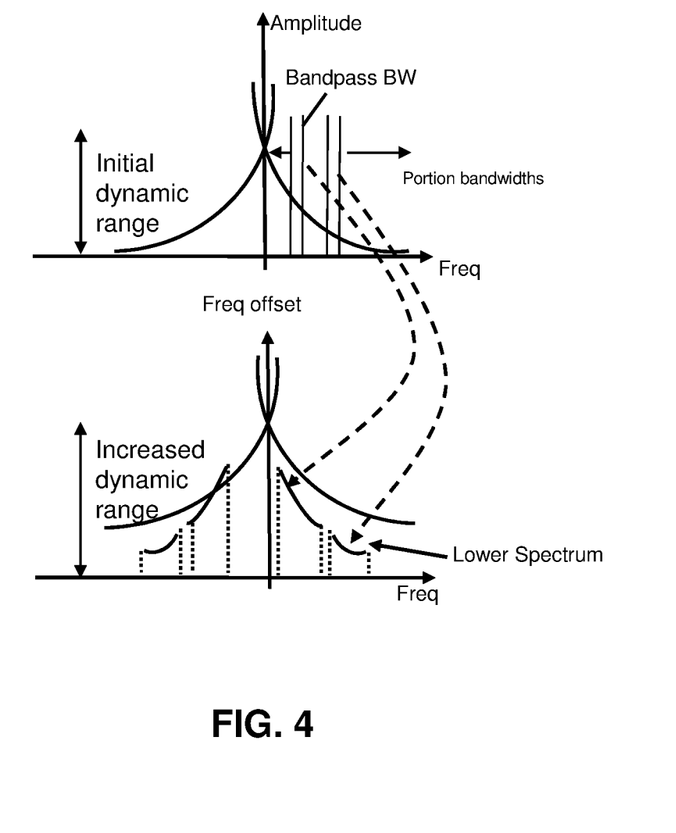
FIG. 4 shows a representative plot of performing FFT analysis on multiple transformable signal bandwidths according to embodiments of the disclosure.

Referring briefly to FIGS. 3 and 4, an example frequency domain analysis for an output signal from DUT 112 is shown to illustrate advantages of system 100. As compared to conventional methodologies, e.g., the analysis of FIG. 1 or system 10 of FIG. 2, system 100 may break the output signal into smaller portions to be transformed and then recombined into a total FFT for the output signal from DUT 112. Embodiments of system 100 thus may apply FFT to the output signal at the transformable frequency (e.g., 0.70 GHz as discussed herein) without an accompanying reduction in testing bandwidth. FIG. 4 shows a first (upper) plot of the output signal from DUT 112 at its initial frequency. Adjusting EO 130, while maintaining reference clock 114 at a fixed value, may cause frequency converter 120 to select a particular bandwidth of the signal for analysis, e.g., as shown by the different "portion bandwidths" in the first plot. The second (lower) plot shows the plot for each selected portion of the output signal from DUT 112 at the transformable frequency. As shown, the selected portions may be converted to smaller segments of limited bandwidth. These selected portions may cover a wider range after being converted to the transformable frequency through frequency converter 120. These portions of the output signal may be provided to waveform analysis module 140 and transformed, e.g., by applying an FFT as discussed herein, before being recombined into a single waveform to test phase noise.

Figure 5:
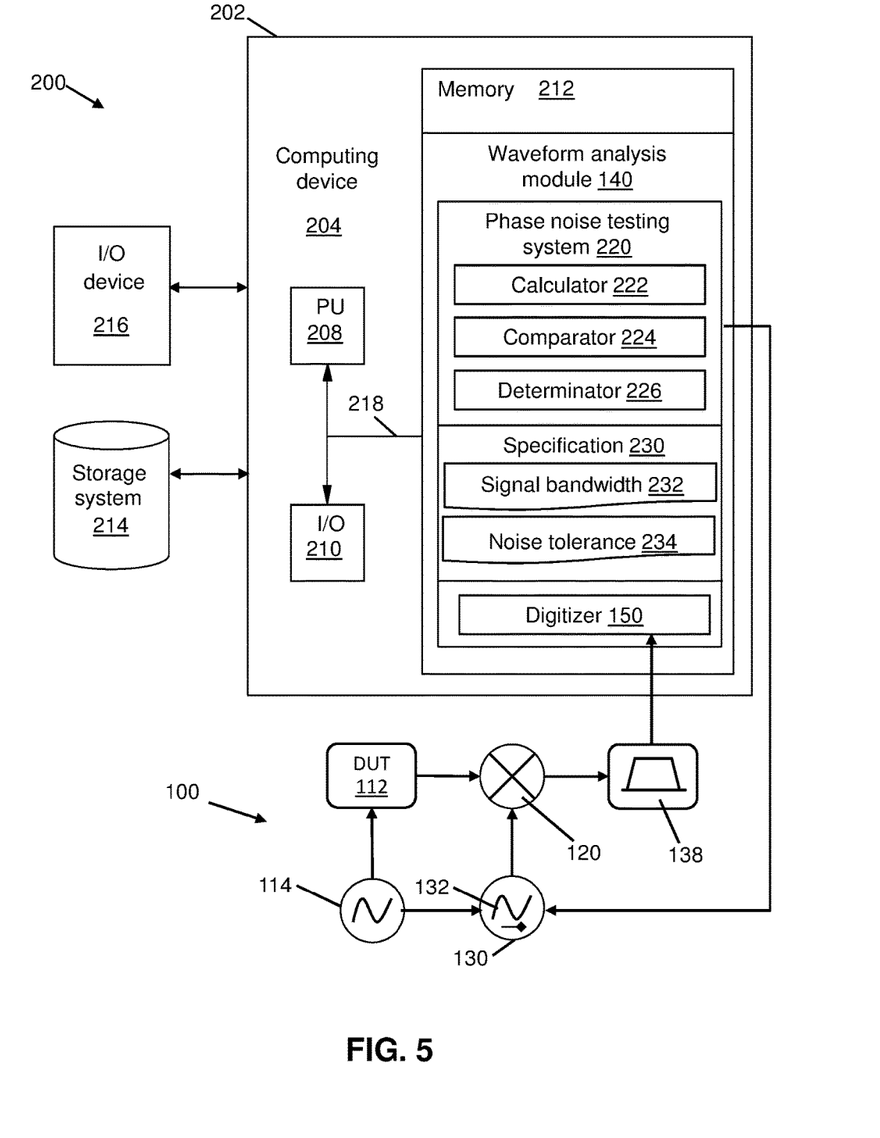
FIG. 5 depicts an illustrative environment, which includes a computer system configured to interact with a frequency converter and including a program to calculate phase noise in the DUT according to embodiments of the disclosure.

Referring to FIG. 5, an illustrative environment 200 for implementing the methods and/or systems described herein is shown. In particular, a computer system 202 is shown to include computing device 204. Computing device 204 may include, waveform analysis module 140 which may include, e.g., on e or more sub-systems (phase noise testing system 220, a specification 230, digitizer 150, etc., for performing any/all of the processes described herein and implementing any/all of the embodiments described herein.

Computer system 202 is shown including a processing unit (PU) 208 (e.g., one or more processors), an I/O component 210, a memory 212 (e.g., a storage hierarchy), an external storage system 214, an input/output (I/O) device 216 (e.g., one or more I/O interfaces and/or devices), and a communications pathway 218. In general, processing unit 208 may execute program code, such as waveform analysis module 140, which is at least partially fixed in memory 212. While executing program code, processing unit 208 may process data, which may result in reading and/or writing data from/to memory 212 and/or storage system 214. Pathway 218 provides a communications link between each of the components in environment 200. I/O component 210 may include one or more human I/O devices, which enable a human user to interact with computer system 202 and/or one or more communications devices to enable a system user to communicate with the computer system 202 using any type of communications link. To this extent, waveform analysis module 140 may manage a set of interfaces (e.g., graphical user interface(s), application program interface(s), etc.) that enable system users to interact with waveform analysis module 140. Further, waveform analysis module 140 may manage (e.g., store, retrieve, create, manipulate, organize, present, etc.) data, through several modules contained within a phase noise testing system 220. Phase noise testing system 220 is shown by example as being a sub-system of waveform analysis module 140.

As noted herein, waveform analysis module 140 may include phase noise testing system 220. In this case, modules 222, 224, 226, of phase noise testing system 220 may enable computer system 202 to perform a set of tasks used by waveform analysis module 140, and may be separately developed and/or implemented apart from other portions of waveform analysis module 140. Calculator 222 can implement various mathematical computations in processes discussed herein. Comparator 224 can compare two quantities and/or items of data in processes discussed herein. Determinator 226 may, e.g., make logical determinations based on compliance or non-compliance with various conditions in processes discussed herein. One or more modules 222, 224, 226, may use algorithm-based calculations, look up tables, software code, and/or similar tools stored in memory 212 for processing, analyzing, and operating on data to perform their respective functions. Each module discussed herein may obtain and/or operate on data from exterior components, units, systems, etc., or from memory 212 of computing device 204.

Computing device 204 and/or waveform analysis module 140 may also include a catalogue of data expressed as a specification 230 which defines various aspects of the output signal from DUT 112 and/or amounts of noise that will be tolerated in an output signal. Specification 230 may include an index of metrics for evaluating whether DUT 112 complies with performance requirements for a particular component, product, system, etc. Specification 230 may be subdivided into various data fields, e.g., two data fields as shown in FIG. 5. For instance, a signal bandwidth data field 232 of specification 230 may provide the upper and lower frequencies of the total signal bandwidth transmitted by DUT 112. Phase noise testing system 220 may refer to signal bandwidth 232 to evaluate whether the entire frequency range of DUT 112 has been tested. Specification 230 may additionally or alternatively include a noise tolerance field 234 used in comparisons while implementing methods according to the disclosure. In some embodiments as discussed herein, DUT 112 must exhibit levels of noise that are below values defined in noise tolerance field 234 to pass a phase noise test. Other rules and/or forms of reference measurements, values, etc., may additionally or alternatively be stored in different fields of specification 230. Phase noise testing system 220 and modules 222, 224, 226 thereof may cross-reference and apply data within specification 230 to implement various processes according to the disclosure, e.g., determining whether the total FFT for an output signal DUT 112 violates noise tolerance 234.

Computer system 202 may be operatively connected to or otherwise in communication with portions of system 100. For example, computer system 202 may receive filtered portions of an output signal from bandpass filter 138, e.g., at digitizer 150. Digitizer 150 may then convert the filtered portions of the output signal into a digital format capable of being processed via phase noise testing system 220. Additionally, phase noise testing system 220 may be communicatively coupled to adjustable EO 130. Through this communicative connection, phase noise testing system 220 may select different portions of the output signal to be converted from the initial frequency to the transformable frequency, and then transmitted to bandpass filter 138 and subsequently to phase waveform analysis module 140. As discussed herein, embodiments of the present disclosure may generate instructions, e.g., through I/O component 210 and/or I/O device 246 to modify DUT 112 in cases where the output signal violates noise tolerance 234, or to mark DUT 112 as being compliant with noise tolerance 234.

Where computer system 202 includes multiple computing devices, each computing device may have only a portion of waveform analysis module 140 and/or phase noise testing system 220 (including, e.g., modules 222, 224, 226) fixed thereon. However, it is understood that computer system 202 and phase noise testing system 220 are only representative of various possible equivalent computer systems that may perform a process described herein. Computer system 202 may obtain or provide data, such as data stored in memory 212 or storage system 214, using any solution. For example, computer system 202 may generate and/or be used to generate data from one or more data stores, receive data from another system, send data to another system, etc.

Figure 6:
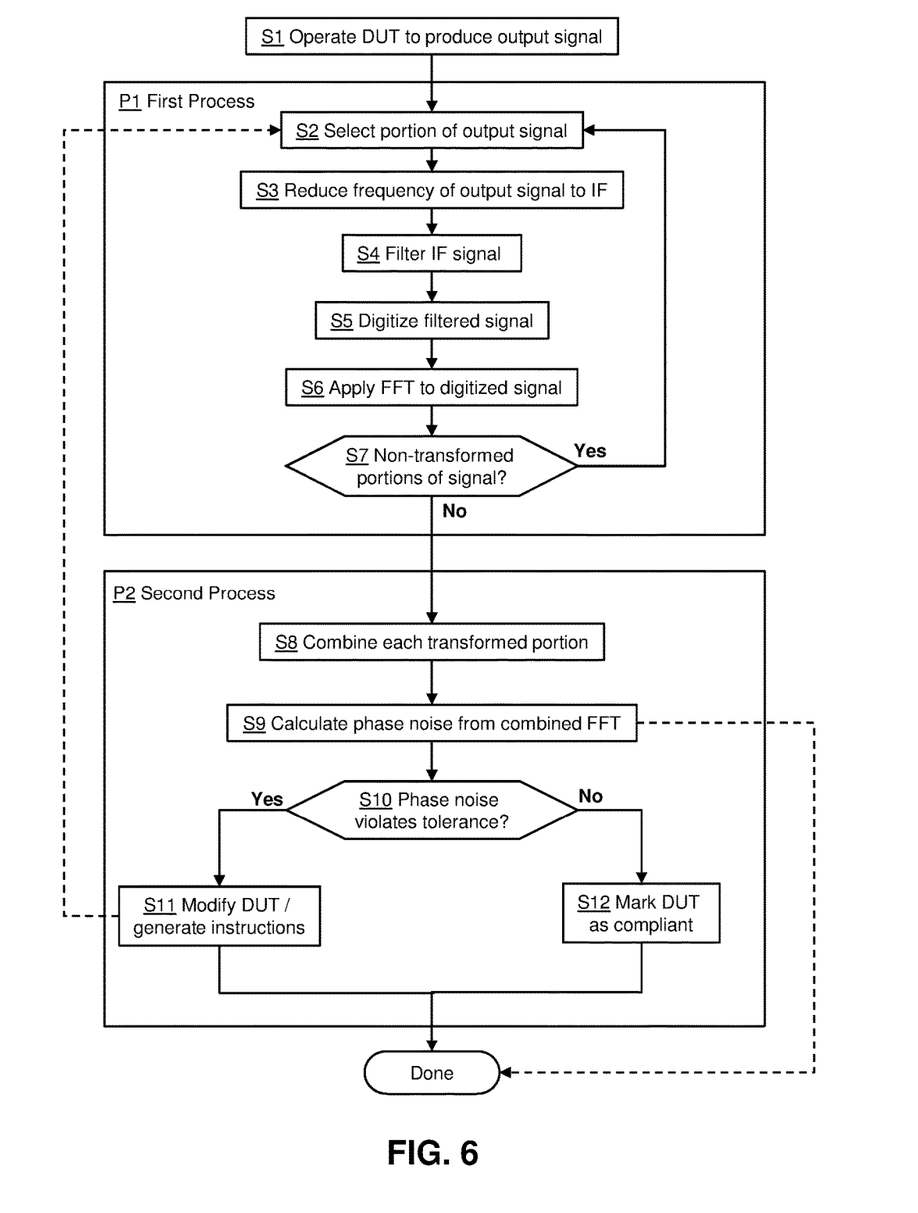
FIG. 6 shows an illustrative flow diagram for implementing a method for testing phase noise of the DUT according to embodiments of the disclosure.

Referring to FIGS. 5 and 6 together, illustrative processes are shown for testing phase noise in output signals from DUT 112. The steps and processes depicted in FIG. 6 may be implemented, e.g., with components of waveform analysis module 140, one or more modules 222, 224, 226 of phase noise testing system 220, and/or other components of computer system 202 described herein by example. Implementing the processes discussed herein may provide a testing methodology which quickly and accurately measures phase noise in a signal by converting portions of a signal from an initial frequency to the transformable frequency, implementing FFT on each portion of the signal, and recombining each transformed portion of the signal into a total FFT for the output signal. It is understood that the present disclosure may be implemented with respect to multiple DUTs 112 simultaneously and/or sequentially, with each DUT 112 providing a different output signal to be tested for phase noise. Other example implementations, alternatives, etc., are discussed herein where appropriate. It is also understood that in further embodiments, some or all of processes P1, P2 shown in FIG. 6 and the various steps S1-S12 may be implemented using special purpose hardware, e.g., an FPGA programmed to implement each of the various steps discussed herein.

The process flow may begin with a step S1 of operating DUT 112 to produce an output signal for analysis. Although methods according to the disclosure may be implemented using multiple DUTs 112 and/or signals for analysis, an example which uses one DUT 112 is discussed for the sake of example. Step S1 may encompass each preliminary action to prepare DUT 112 for testing. Step S1 may include, e.g., electrically coupling DUT 112 to system 100 such that output signals from DUT 112 are transmitted to frequency converter 120 and thereafter transmitted to other components of system 100. Step S1 may also include, e.g., initiating the operation of DUT 112 and generating fixed reference clock 114 of DUT 112 to produce an output signal. The following processes shown in FIG. 6 may be implemented to test the phase noise in the output signal. As discussed herein, the subsequent steps will be described as implemented as part of a first process P1 and a second process P2, for clarity. First process P1 and the steps thereof may be implemented as a loop for creating and analyzing multiple portions of an output signal from DUT 112. Second process P2 and the steps thereof may be implemented after first process P1 ends. It is understood that some steps of process P1 may be moved to process P2 and vice versa in alternative implementations, and the flow diagram of FIG. 6 illustrates one arrangement of steps into each process P1, P2.

Following step S1, first process P1 may begin with a step S2 of selecting one portion of the output signal from DUT 112 to be analyzed. The selecting may be performed manually by a user, e.g., by selecting a bandwidth of the output signal to be tested for phase noise. The selecting may also occur automatically through phase noise testing system 220, e.g., by setting an initial bandwidth for testing or by adjusting a previously tested bandwidth by a predetermined amount as discussed elsewhere herein. The total signal bandwidth to be tested may be stored, e.g., in signal bandwidth field 232 of specification 230. Signal bandwidth field 232 may also include or be subdivided into individual portions of a signal to be transformed in first process P1. In any case, the portion of the output signal selected in step S2 may correspond to one of several selectable frequencies for EO 130, as noted elsewhere herein. In any case, the output signal bandwidth selected in step S2 may represent a fraction of the total signal bandwidth. For instance, a signal having a total frequency domain bandwidth of, e.g., 10 MHz may be tested in embodiments of the present disclosure over portions having a bandwidth of 30 KHz, 50 KHz, 0.50 GHz, and/or other frequencies ranges suitable for the frequency domain bandwidth.

The first process may then proceed to a step S3 of reducing the frequency of the output signal of DUT 112 from its initial frequency to a transformable frequency. As noted elsewhere herein, the transformable frequency signal created by frequency converter 120 may have a fixed value, e.g., approximately 0.7 GHz as compared to an initial bandwidth of approximately 12 GHz. Different portions of the output signal may be selected by adjusting the frequency of an EO 130 for providing a signal to mix with the output signal from DUT 112. Step S3 thus may include increasing or decreasing the frequency of EO 130 to convert one portion of the output signal to the predetermined transformable frequency.

Following step S3, first process P1 may proceed to step S4 of filtering the transformable frequency signal transmitted from frequency converter 120. The filtering in step S4 may be implemented using bandpass filter 138 as noted elsewhere herein. Bandpass filter 138 in addition may have a fixed filtering bandwidth regardless of which portion of the output signal has been selected in step S2 and reduced in frequency in step S3. According to an example, the transformable frequency signal may be filtered using a filtering bandwidth of, e.g., approximately 30 KHz. The filtering may remove unwanted portions of the signal remaining after the reducing of frequency in step S3, e.g., above and below predetermined frequency limits for analysis. The filtering in step S4 thus may prevent noise contamination from signal portions outside the selected range, and thus reduce incoherent sampling within the selected portion of the output signal. The resulting signal may be known as a "filtered portion of the output signal" after the filtering in step S4 is completed.

After the filtering in step S4, first process P1 may continue to an additional step S5 of digitizing the filtered portion of the output signal. The digitizing in step S5 may not have any effect on the signal information provided to waveform analysis module 140. The digitizing in step S5 may simply convert the filtered portion of the output signal from an analog format to a digital format configured to be processed using waveform analysis module 140. Step S5 may be implemented using digitizer 150 as a component of computer system 202, or alternatively may be implemented via special-purpose hardware (e.g., an FPGA, electronic component, etc.), configured to accept analog signals as an input and create digital representations of the same signal as an output.

First process P1 may thereafter continue to step S6 of applying an FFT to the filtered portion of the output signal to create a transformed portion of the output signal. Calculator 222 of phase noise testing system 220 may be configured to apply the FFT operation on portions of a signal input to phase noise testing system 220. As noted elsewhere herein, FFT refers to a series of mathematical operations capable of transforming a signal into a substantially equivalent sum of individual sine curves each having a respective frequency, wavelength, phase offset, etc. The resulting sum of individual sine curves may be known to as a "transformed portion of the output signal." It is advantageous to create transformed portions of the output signal because some of the individual sine curves may be indicative of noise levels in the transformed portion of the output signal. In addition, several transformed portions of the output signal may be mathematically combined in subsequent steps to create a total FFT for the output signal of DUT 112. The resulting transformed portion of the output signal may be stored, e.g., in memory 212 and/or storage system 214 with other transformed portions of the output so that each transformed portion may be combined in a future step.

Continuing to step S7 of first process P1, determinator 226 may determine whether any portions of the output signal from DUT 112 have not been transformed into a transformed portion of the output signal. The determination in step S7 may be performed by cross-referencing each transformed portion of the output signal with the original output signal. Determinator 226 may then determine whether any portions of the original output signal lack corresponding portions of the output signal. Alternatively, step S7 may include whether adjustable reference clock 134 has not selected one portion of the output signal to be transformed. In still further embodiments, determinator 226 of phase noise testing system 220 may examine signal bandwidth field 232 of specification 230 to determine whether any portions of the output signal have not been transformed. In the event that waveform analysis module 140 determines that at least one portion of the signal has not been transformed (i.e., "Yes" at step S7), first process P1 may return to step S2 of selecting another portion of the output signal from DUT 112 to be transformed. The other steps S3-S7 may then repeat for the next portion of the output signal. Thus, steps S2-S7 may be implemented in a looping fashion until each portion of the output signal has been transformed. In the event that waveform analysis module 140 determines that the entire output signal has been transformed (i.e., "No" at step S7), the methodology may proceed to a second process P2 to calculate phase noise of the entire signal using the transformed portions of the output signal.

Second process P2 may begin, e.g., with a step S8 of combining each transformed portion of the output signal into a total FFT for the output signal of DUT. Calculator 222 of phase noise testing system 220 may combine each combined portion of the output signal into a total FFT by using superposition as noted elsewhere herein. In other words, each of the component sine curves created by transforming each portion of the output signal can be added together to create a combined sum of sine curves for the entire output signal from DUT 112.

Second process P2 may continue to a step S9 of calculating phase noise for the entire signal using the total FFT created from the transformed portions of the output signal. Calculator 222 of phase noise testing system 220 may calculate phase noise for the total FFT using any currently-known or later-developed mathematical algorithm for quantifying phase noise based on an FFT representation of a signal in the frequency domain. For instance, the calculating of phase noise in step S9 may include identifying component sine curves which deviate from an expected value by a predetermined amount, and subtracting a baseline signal value to compute the phase noise of the signal. The phase noise may be mathematically converted to one or more units of measurement for quantifying phase noise. For example, phase noise may be expressed as "jitter" and measured in seconds. Jitter may be calculated by the phase error (measured, e.g., in degrees) divided by the product of frequency (e.g., in MHz) and 360 degrees. Alternative formulas or methods for evaluating signal jitter may be employed in alternative embodiments. The method may conclude ("Done") after phase noise is calculated, as shown by the phantom line from step S9 of second process P2. In this case a designer, manufacturer, tester, operator, etc., of DUT 112 may then separately analyze the phase noise and mark DUT 112 as being compliant with its specification, or take corrective action, based on the calculated amount of phase noise in the signal.

In further embodiments, second process P2 may optionally include additional steps to automate the analysis of phase noise and/or subsequent actions to be implemented on DUT 112. Second process P2 thus may continue from step S9 to step S10 of determining whether the phase noise calculated in step S9 violates a tolerance value for DUT 112. Step S10 may include, e.g., comparator 224 of phase noise testing system 220 comparing the calculated phase noise value with noise tolerance field 234 in specification 230. According to an example, noise tolerance filed 235 may specify a maximum jitter of, e.g., approximately 0.50 nanoseconds (ns). Phase noise levels which cause a maximum jitter of more than approximately 0.50 ns will thus violate the noise tolerance for DUT 112.

In the event that the calculated phase noise (expressed, e.g., in seconds) violates the tolerance level for DUT 112 (i.e., "Yes" at step S10), second process P2 may proceed to step S11 of modifying DUT 112 or generating instructions to modify DUT 112. The modifying of DUT 112 in step S11 may include manually changing, repairing, replacing, etc., hardware included in DUT 112. In other cases, step S11 may include adjusting operational settings of DUT 112 without changing its components. Step S11 may also include causing a manufacturing system, testing system, operator, etc., to make changes to DUT 112, or discard DUT 112, based on generated instructions. The second process P2 may then conclude ("Done"), or alternatively cause first process P1 to repeat using the modified DUT 112 to test phase noise again. In the event that the calculated phase noise does not violate the tolerance level for DUT 112 (i.e., "No" at step S10) second process P2 may instead continue to step S12 of marking DUT 112 as compliant. Step S12 thus may be embodied as generating a message to an operator that DUT 112 operates with acceptable signal noise, creating a tag in memory 212 and/or storage system 214 of computer system 202 to indicate that DUT 112 has passed the phase noise test, or otherwise modifying DUT 112 to mark DUT 112 as being compliant. Second process P2 may then conclude ("Done"). In any case, the method may then be implemented on another DUT 112, group of DUTs 112, or even on the same DUT(s) 112 using different operational settings that are also in need of a phase noise test.

The various embodiments described herein may provide several technical benefits for each DUT, group of devices, etc. For example, embodiments of the method may be implemented on one or more testing devices to increase the speed of a phase noise test, and thus allow a test house to process a larger number of DUTs over a particular timespan. Additionally, embodiments of the disclosure may allow for a single testing device to be used more efficiently and economically. As noted elsewhere herein, the various embodiments described herein may expand the dynamic range of testing and thus produce higher-quality test results for determining whether a particular DUT is compliant with specification requirements. The various embodiments described herein may also allow various manually-implemented test steps to be performed automatically without the intervention of a user, thereby further increasing the speed of testing and the total number of DUTs that may be tested over a time interval.

As will be appreciated by one skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be used. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the layout, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As used herein, the term "configured," "configured to" and/or "configured for" may refer to specific-purpose patterns of the component so described. For example, a system or device configured to perform a function may include a computer system or computing device programmed or otherwise modified to perform that specific function. In other cases, program code stored on a computer-readable medium (e.g., storage medium), may be configured to cause at least one computing device to perform functions when that program code is executed on that computing device. In these cases, the arrangement of the program code triggers specific functions in the computing device upon execution. In other examples, a device configured to interact with and/or act upon other components may be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component may aid in performing a function, for example, displacement of one or more of the device or other component, engagement of one or more of the device or other component, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for testing phase noise in an output signal of a device under test (DUT), the method comprising:
    performing a first process including:
        reducing one of a plurality of portions of the output signal of the DUT from an initial frequency to a transformable frequency,
        filtering the selected portion of the output signal at the transformable frequency outside a predetermined bandwidth to create a filtered portion of the output signal,
        applying a Fast Fourier Transform (FFT) to the filtered output signal for the selected portion of the output signal to create a transformed portion of the output signal, and
        repeating the reducing, the filtering, and the applying until a transformed portion of the output signal is created for each of the plurality of portions of the output signal; and
    upon completing the first process, perform a second process including:
        combining each transformed portion of the output signal to create a total FFT for the output signal of the DUT, and
        calculating a phase noise for the output signal of the DUT based on the total FFT for the output signal of the DUT.

2. The method of claim 1, wherein the first process further includes selecting one of the plurality of portions of the output signal by adjusting an electronic oscillator (EO) of a frequency converter configured to receive the output signal of the DUT.

3. The method of claim 2, wherein adjusting the EO of the frequency converter includes increasing or decreasing a frequency of the EO by a predetermined amount.

4. The method of claim 2, the EO of the frequency converter is coupled to an RF mixer, the RF mixer receiving the output signal of the DUT and the EO.

5. The method of claim 1, wherein the output signal from the DUT comprises a radio signal output from a radio frequency (RF) device.

6. The method of claim 1, wherein the second process further includes:
    determining whether the calculated phase noise violates a noise tolerance for the DUT;
    marking the DUT as compliant in response to determining the calculated phase noise does not violate the noise tolerance for the DUT; and
    modifying the DUT and repeating the first process in response to determining the calculated phase noise violates the noise tolerance for the DUT.

7. The method of claim 1, wherein the predetermined bandwidth of the bandpass filter is selectable between one of a plurality of bandwidth ranges.

8. A system for testing phase noise in an output signal of a device under test (DUT), the system comprising:
    a frequency converter configured to reduce a frequency of the output signal of the DUT from an initial frequency to a transformable frequency, wherein an electronic oscillator (EO) of the frequency converter is selectable between a plurality of frequencies to convert one of a plurality of portions of the output signal, and wherein each of the plurality of frequencies is configured to convert one of the plurality of portions of the output signal from the initial frequency to the transformable frequency;
    a bandpass filter electrically coupled to the frequency converter and configured to filter each of the plurality of portions of the output signal at the transformable frequency outside a predetermined bandwidth to create a filtered portion of the output signal; and
    a waveform analysis module communicatively coupled to the frequency converter, and configured to receive the filtered portion of the output signal from the bandpass filter, and further configured to:
        perform a first process including:
            selecting one of the plurality of portions of the output signal using the frequency converter,
            receiving the filtered portion output signal corresponding to the selected frequency of the EO of the frequency converter,
            applying a Fast Fourier Transform (FFT) to the filtered portion of the output signal to create a transformed portion of the output signal, and repeating the selecting, the receiving, and the applying until a transformed portion of the output signal is created for each of the plurality of portions of the output signal; and upon completing the first process, perform a second process including:

combining each transformed portion of the output signal to create a total FFT for the output signal of the DUT, and calculating a phase noise for the output signal of the DUT based on the total FFT for the output signal of the DUT.

9. The system of claim 8, wherein the waveform analysis module includes a digitizer component, and wherein the first process further includes transcribing the filtered output signal into a digital representation before applying the FFT.

10. The system of claim 8, wherein the waveform analysis module comprises a field programmable gate array (FPGA) with logic configured to perform the first process and the second process.

11. The system of claim 8, wherein the waveform analysis module adjusts a frequency of the EO to select one of the plurality of portions of the output signal.

12. The system of claim 8, wherein the DUT comprises a radio frequency (RF) device.

13. The system of claim 8, wherein the frequency converter includes an RF mixer.

14. The system of claim 8, wherein the predetermined bandwidth of the bandpass filter is selectable between one of a plurality of bandwidth ranges.

15. A computer program product stored on a computer readable storage medium, the computer program product comprising program code, which, when being executed by at least one computing device, causes the computing device to test phase noise in an output signal of a device under test (DUT) by performing actions including:

performing a first process including:

signaling a frequency converter to reduce a frequency of a portion of the output signal of the DUT from an initial frequency to a transformable frequency, wherein a bandpass filter electrically coupled to the frequency converter filters the portion of the output signal at the transformable frequency outside a predetermined bandwidth to create a filtered portion of the output signal, applying a Fast Fourier Transform (FFT) to the filtered output signal for the filtered portion of the output signal to create a transformed portion of the output signal, and repeating the reducing and the applying until a transformed portion of the output signal is created for each of the plurality of portions of the output signal; and upon completing the first process, perform a second process including:

combining each transformed portion of the output signal to create a total FFT for the output signal of the DUT, and calculating a phase noise for the output signal of the DUT based on the total FFT for the output signal of the DUT.

16. The program product of claim 15, wherein the signaling adjusts an electronic oscillator of the frequency converter by a predetermined amount.

17. The program product of claim 15, further comprising program code for transcribing the filtered output signal into a digital representation before applying the FFT.

18. The program product of claim 15, wherein the output signal from the DUT comprises a radio signal output from a radio frequency (RF) device.

19. The program product of claim 15, wherein the second process further includes:

determining whether the calculated phase noise violates a noise tolerance for the DUT;

marking the DUT as compliant in response to determining the calculated phase noise does not violate the noise tolerance for the DUT; and generating instructions to modify the DUT in response to determining the calculated phase noise violates the noise tolerance for the DUT.

20. The program product of claim 15, wherein the predetermined bandwidth of the bandpass filter is selectable between one of a plurality of bandwidth ranges.

* * * * *